(12) United States Patent
Liu et al.

(10) Patent No.: US 12,196,559 B2
(45) Date of Patent: Jan. 14, 2025

(54) VEHICLE-ROAD COOPERATION PRECISE POSITIONING METHOD BASED ON ELECTRIFIED HIGHWAY

(71) Applicant: RESEARCH INSTITUTE OF HIGHWAY MINISTRY OF TRANSPORT, Beijing (CN)

(72) Inventors: Zhichao Liu, Beijing (CN); Wei Zhou, Beijing (CN); Wenliang Li, Beijing (CN); Liwei Zhu, Beijing (CN); Chen Li, Beijing (CN); Yujiang Song, Beijing (CN); Xiao Li, Beijing (CN); Chen Cao, Beijing (CN); Qi Zhan, Beijing (CN); Jin Gao, Beijing (CN); Huajian Li, Beijing (CN); Xuewen Zhang, Beijing (CN); Jie Jin, Beijing (CN)

(73) Assignee: RESEARCH INSTITUTE OF HIGHWAY MINISTRY OF TRANSPORT, Beijing (CN)

( * ) Notice: Subject to any disclaimer, the term of this patent is extended or adjusted under 35 U.S.C. 154(b) by 0 days.

(21) Appl. No.: 18/425,197

(22) Filed: Jan. 29, 2024

(65) Prior Publication Data
US 2024/0255286 A1    Aug. 1, 2024

(30) Foreign Application Priority Data
Jan. 29, 2023    (CN) .......................... 202310043600.5

(51) Int. Cl.
*G01C 21/28* (2006.01)
*B60L 5/24* (2006.01)

(52) U.S. Cl.
CPC ................ *G01C 21/28* (2013.01); *B60L 5/24* (2013.01)

(58) Field of Classification Search
CPC ................................ G01C 21/28; B60L 5/24
See application file for complete search history.

(56) References Cited

U.S. PATENT DOCUMENTS

| | | | | |
|---|---|---|---|---|
| 2018/0001929 A1* | 1/2018 | Buehs | .................... | B62D 6/008 |
| 2019/0251847 A1* | 8/2019 | Wu | ........................ | G08G 1/056 |
| 2021/0347264 A1* | 11/2021 | Blase | ........................ | B60L 5/24 |

FOREIGN PATENT DOCUMENTS

| | | |
|---|---|---|
| CN | 108615364 A | 10/2018 |
| CN | 109862505 A | 6/2019 |

(Continued)

*Primary Examiner* — Jess Whittington
*Assistant Examiner* — Brian E Yang
(74) *Attorney, Agent, or Firm* — Hawaii Patent Services; Nathaniel K. Fedde; Kenton N. Fedde (57) ABSTRACT

A vehicle-road cooperation precise positioning method based on an electrified highway includes measuring position information of its own positioning point by using a roadside positioning module; determining absolute coordinates of all points on a communication line according to the position information; acquiring a contact signal when a vehicle-road connection information system comes into contact with the communication line, and determining position information of a contact point according to the contact signal and the absolute coordinates; and based on a conversion algorithm, determining current vehicle mass center position coordinate information according to the position information of the contact point and parameter information of the vehicle-road connection information system. In the process of real-time acquisition of vehicle dynamic position information, the method does not rely on a satellite positioning system at all and is based on a wired vehicle-road connection of the electrified highway, so that timeliness and reliability are higher.

4 Claims, 6 Drawing Sheets

(56) References Cited

FOREIGN PATENT DOCUMENTS

| CN | 110906939 A | 3/2020 |
|---|---|---|
| CN | 112113580 A | 12/2020 |
| WO | WO-2022228523 A1 | 11/2022 |

\* cited by examiner

VEHICLE-ROAD COOPERATION PRECISE POSITIONING METHOD BASED ON ELECTRIFIED HIGHWAY

TECHNICAL FIELD

The present invention relates to the technical field of electronics and safety of intelligent vehicles, and in particular to a vehicle-road cooperation precise positioning method based on an electrified highway.

BACKGROUND

A transportation system of an electrified highway mainly consists of electrified transportation equipment, power supply infrastructure, etc. The power supply infrastructure is arranged on the roadside, to provide power for electrified transportation equipment using direct current as energy. The electrified transportation equipment is a "grid+battery" or "grid+internal combustion engine" hybrid vehicle, which is equipped with a set of pantograph and motor drive system on the basis of the original vehicle. When traveling on the electrified highway, the electrified transportation equipment may be connected to a roadside grid through a pantograph. At the same time, the grid power may also charge a small power battery carried by the vehicle. This system may achieve full coverage of road transportation application scenarios of heavy-duty freight vehicles, and is especially suitable for fixed-route, high-frequency, and heavy-load cargo transportation conditions.

Automobile intelligent systems such as autonomous driving systems are mostly used in electrified highway transportation systems. The prerequisite for control is to understand a current traveling state of the vehicle. By comparing the current traveling state of the vehicle with a target state, it is judged whether corresponding measures need to be taken to control the vehicle, so as to ensure the stability of the vehicle and improve traveling safety. The position information of the vehicle in all directions and the vehicle speed and acceleration information during the traveling process of the vehicle can describe the traveling state of the vehicle, which is important information that characterizes the traveling state and is an important information source for a vehicle driving assistance system and an automatic driving system.

Currently, a Global Navigation Satellite System (GNSS) is a commonly used positioning system for a vehicle. The GNSS can provide the vehicle with an affordable and easily accessible global absolute positioning scheme. The accuracy of the vehicle self-positioning directly affects the path planning and decision-making control of the vehicle. The development of vehicle intelligent technology has gradually increased the requirements for vehicle self-positioning. Differential GNSS positioning technology has emerged in the market, which can provide lane-level positioning accuracy for vehicles, but has the following disadvantages:

1) GNSS positioning technology has high requirements for the vehicle traveling environment, and an error of using the GNSS positioning technology to obtain the vehicle position is very large when there are dense buildings, obstructions, and tunnels.

2) At present, the positioning accuracy of a differential GNSS can reach 2 cm. Due to the influence of communications, the timeliness and stability are poor.

The existing technology also provides technical schemes for vehicle positioning based on LiDAR, where the LiDAR generally consists of a laser light source transmitter, an optical receiving device, an information processing system and the like. An electric pulse is converted into a light pulse through the laser light source emitter for emission, and the optical receiving device converts light wave information reflected from the target into electric pulse quantity. By measuring the distance to the target from the time difference between reception and reflection, position information is derived in conjunction with the angle of the laser emission. However, its disadvantage is that it needs to be equipped with a LiDAR device. The cost of LiDAR that meets the positioning accuracy is high, which increases the cost of a single vehicle.

With the development of V2X and 5G technologies, a positioning method based on vehicle-road cooperation multi-point ranging is gradually applied to intelligent vehicles. Through communication ranging between a vehicle-mounted terminal mounted on a vehicle and different base stations on the roadside, position coordinates of the vehicle may be determined based on different communication methods and algorithms. However, different vehicles are equipped with different vehicle-mounted units, and the communication protocols between the vehicle-mounted units and the roadside base stations have not yet been unified. In addition, the positioning accuracy of vehicle-road collaboration is directly related to the communication quality.

SUMMARY

In order to overcome the defects of the existing technology, an objective of the present invention is to provide a vehicle-road cooperation precise positioning method based on an electrified highway.

In order to achieve the above objective, the present invention provides the following schemes:

A vehicle-road cooperation precise positioning method based on an electrified highway, which method is applied to a vehicle-road cooperation positioning system of the electrified highway. The vehicle-road cooperation positioning system of the electrified highway includes a roadside bracket, a roadside positioning module, a communication line and a vehicle-road connection information system, where the roadside bracket, the roadside positioning module and the communication line are all arranged on the electrified highway, the roadside positioning module is fixed to the roadside bracket, and the roadside positioning module is connected to the vehicle-road connection information system through the communication line;

the methods including:
measuring position information of its own positioning point by using the roadside positioning module;
determining absolute coordinates of all points on the communication line according to the position information;
acquiring a contact signal when the vehicle-road connection information system comes into contact with the communication line, and determining position information of a contact point according to the contact signal and the absolute coordinates; and
based on a conversion algorithm, determining current vehicle mass center position coordinate information according to the position information of the contact point and parameter information of the vehicle-road connection information system.

Preferably, the vehicle-road connection information system includes: a pantograph, an attitude angle sensor, a communication harness and a vehicle-mounted unit, where the pantograph includes an upper arm rod and a lower arm rod which are connected to each other; the upper arm rod is semi-rigidly connected to the communication line while the vehicle is traveling;

the vehicle-mounted unit is connected to the communication line through the communication harness and by means of the pantograph; the attitude angle sensor is arranged on the pantograph; and the attitude angle sensor is configured to measure attitude angles of the upper arm rod and the lower arm rod in real time.

Preferably, the roadside positioning module is connected to the communication line by means of a physical interface in a wired way; and the communication line is configured for power and information transmission.

Preferably, acquiring a contact signal when the vehicle-road connection information system comes into contact with the communication line, and determining position information of a contact point according to the contact signal and the absolute coordinates includes:

when the pantograph comes into contact with the communication line, acquiring a contact signal at the contact point, and respectively transmitting the contact signal to two roadside positioning modules closest to the contact point;

by using the roadside positioning module that first receives the contact signal, calculating a distance between the contact point and the roadside positioning module according to the time when the roadside positioning module receives the contact signal, the distance including a longitudinal offset and a lateral offset; and determining position information of the contact point according to the longitudinal offset, the lateral offset and the position information of its own positioning point of the roadside positioning module.

Preferably, based on a conversion algorithm, determining current vehicle mass center position coordinate information according to the position information of the contact point and parameter information of the vehicle-road connection information system includes:

determining position information of two end points of the lower arm rod according to structural parameter information of the pantograph, the attitude angle and the position information of the contact point; and based on a conversion algorithm between a contact point and a vehicle mass center position, determining the current vehicle mass center position coordinate information according to the position information of the two end points.

According to the specific embodiments provided by the present invention, the present invention discloses the following technical effects:

The present invention provides a vehicle-road cooperation precise positioning method based on an electrified highway, which method is applied to a vehicle-road cooperation positioning system of the electrified highway. The vehicle-road cooperation positioning system of the electrified highway includes a roadside bracket, a roadside positioning module, and a communication line and a vehicle-road connection information system, where the roadside bracket arrangement, the roadside positioning module and the communication line are all arranged on the electrified highway, the roadside positioning module is fixed to the roadside bracket, and the roadside positioning module is connected to the vehicle-road connection information system through the communication line; the methods including: measuring position information of its own positioning point by using the roadside positioning module; determining absolute coordinates of all points on the communication line according to the position information; acquiring a contact signal when the vehicle-road connection information system comes into contact with the communication line, and determining position information of a contact point according to the contact signal and the absolute coordinates; and based on a conversion algorithm, determining current vehicle mass center position coordinate information according to the position information of the contact point and parameter information of the vehicle-road connection information system. In the process of real-time acquisition of vehicle dynamic position information, the present invention does not rely on a satellite positioning system at all and is based on a wired vehicle-road connection of the electrified highway, so that the timeliness and reliability are higher.

BRIEF DESCRIPTION OF THE DRAWINGS

In order to illustrate the technical schemes in the embodiments of the present invention or in the prior art more clearly, the accompanying drawings to be used in the embodiments will be briefly introduced below. Obviously, the accompanying drawings in the following description are only a part of the embodiments of the present invention, and those of ordinary skill in the art may also obtain other accompanying drawings based on these accompanying drawings without creative effort.

DETAILED DESCRIPTION

The technical schemes in the embodiments of the present invention will be clearly and completely described below with reference to the accompanying drawings in the embodiments of the present invention. Obviously, the described embodiments are only some of, not all of, the embodiments of the present invention. All other embodiments obtained by those of ordinary skill in the art based on the embodiments of the present invention without creative effort shall fall into the scope of protection of the present invention.

Reference to "an embodiment" herein means that a particular feature, structure or characteristic described in conjunction with embodiments may be included in at least one embodiment of the present application. This phrase appearing in various positions in the specification does not necessarily refer to the same embodiment, nor is an independent or alternative embodiment that is mutually exclusive with other embodiments. Those of ordinary skill in the art understand explicitly and implicitly that the embodiments described herein may be combined with other embodiments.

Terms such as "first", "second", "third" and "fourth" in the specification, claims and accompanying drawings of the present application are used to distinguish different objects, rather than to describe a specific sequence. Furthermore, terms "including" and "having" and any variations thereof are intended to cover non-exclusive inclusions. For example, including a series of steps, processes, methods, etc. is not limited to include the listed steps or units, but optionally also include steps or units that are not listed, or optionally also include steps or units inherent to these processes, methods, products or devices.

In order to make the above objectives, features and advantages of the present invention more obvious and understandable, the present invention will be described in further detail below with reference to the accompanying drawings and specific embodiments.

Figure 1:
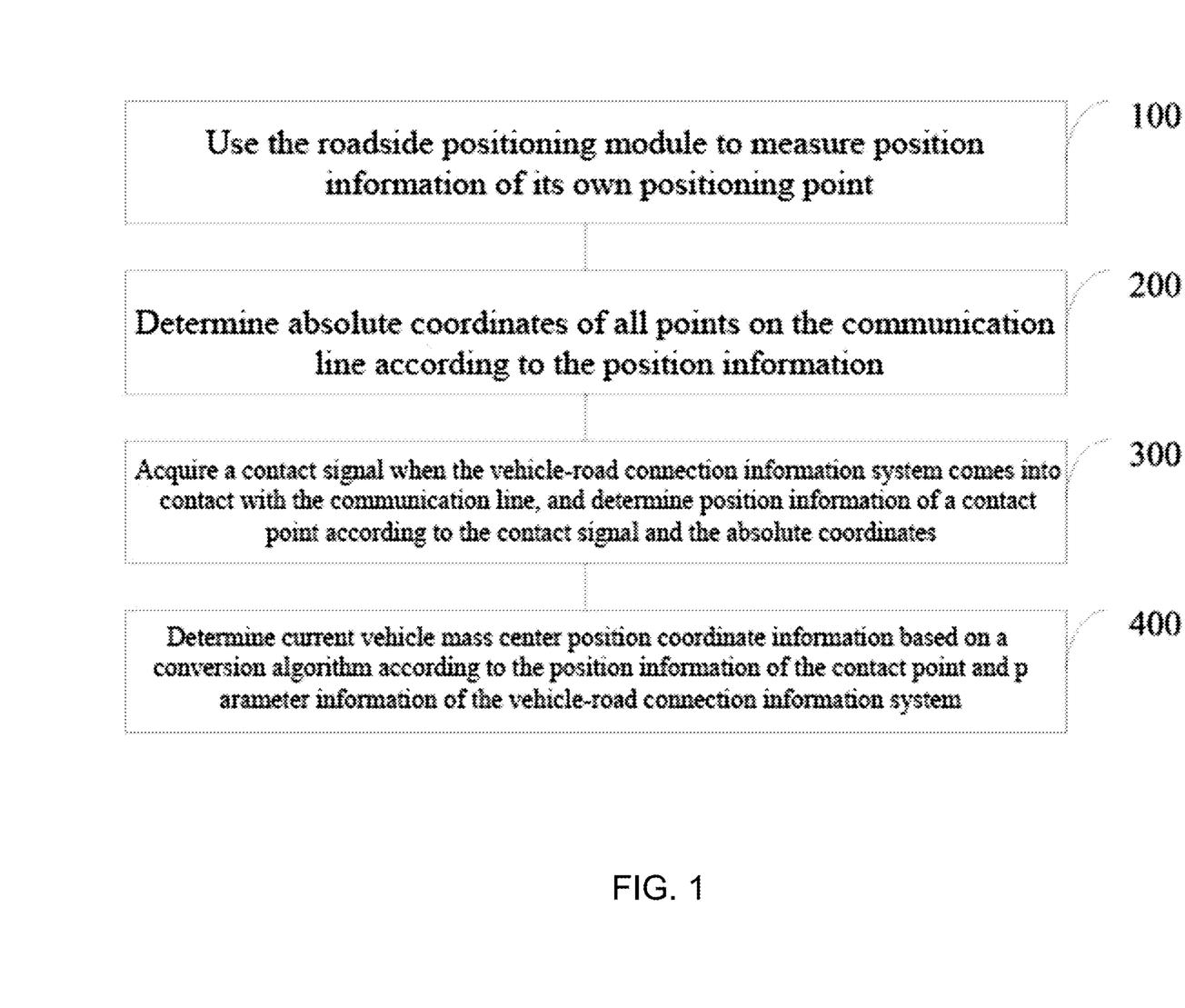
FIG. 1 is a flow chart of a method provided by an embodiment of the present invention.

FIG. 1 is a flow chart of a method provided by an embodiment of the present invention. As shown in FIG. 1, the present invention provides a vehicle-road cooperation precise positioning method based on an electrified highway, which method is applied to a vehicle-road cooperation positioning system of the electrified highway. The vehicle-road cooperation positioning system of the electrified highway includes a roadside bracket, a roadside positioning module, a communication line and a vehicle-road connection information system, where the roadside bracket, the roadside positioning module and the communication line are all arranged on the electrified highway, the roadside positioning module is fixed to the roadside bracket, and the roadside positioning module is connected to the vehicle-road connection information system through the communication line;

the methods including:
step 100, measure position information of its own positioning point by using the roadside positioning module;
step 200, determine absolute coordinates of all points on the communication line according to the position information;
step 300, acquire a contact signal when the vehicle-road connection information system comes into contact with the communication line, and determine position information of a contact point according to the contact signal and the absolute coordinates; and
step 400, based on a conversion algorithm, determine current vehicle mass center position coordinate information according to the position information of the contact point and parameter information of the vehicle-road connection information system.

Preferably, the vehicle-road connection information system includes: a pantograph, an attitude angle sensor, a communication harness and a vehicle-mounted unit, where the pantograph includes an upper arm rod and a lower arm rod which are connected to each other; the upper arm rod is semi-rigidly connected to the communication line while the vehicle is traveling; the vehicle-mounted unit is connected to the communication line through the communication harness and by means of the pantograph; the attitude angle sensor is arranged on the pantograph; and the attitude angle sensor is configured to measure attitude angles of the upper arm rod and the lower arm rod in real time. The roadside positioning module is connected to the communication line by means of a physical interface in a wired way; and the communication line is configured for power and information transmission.

Figure 2:
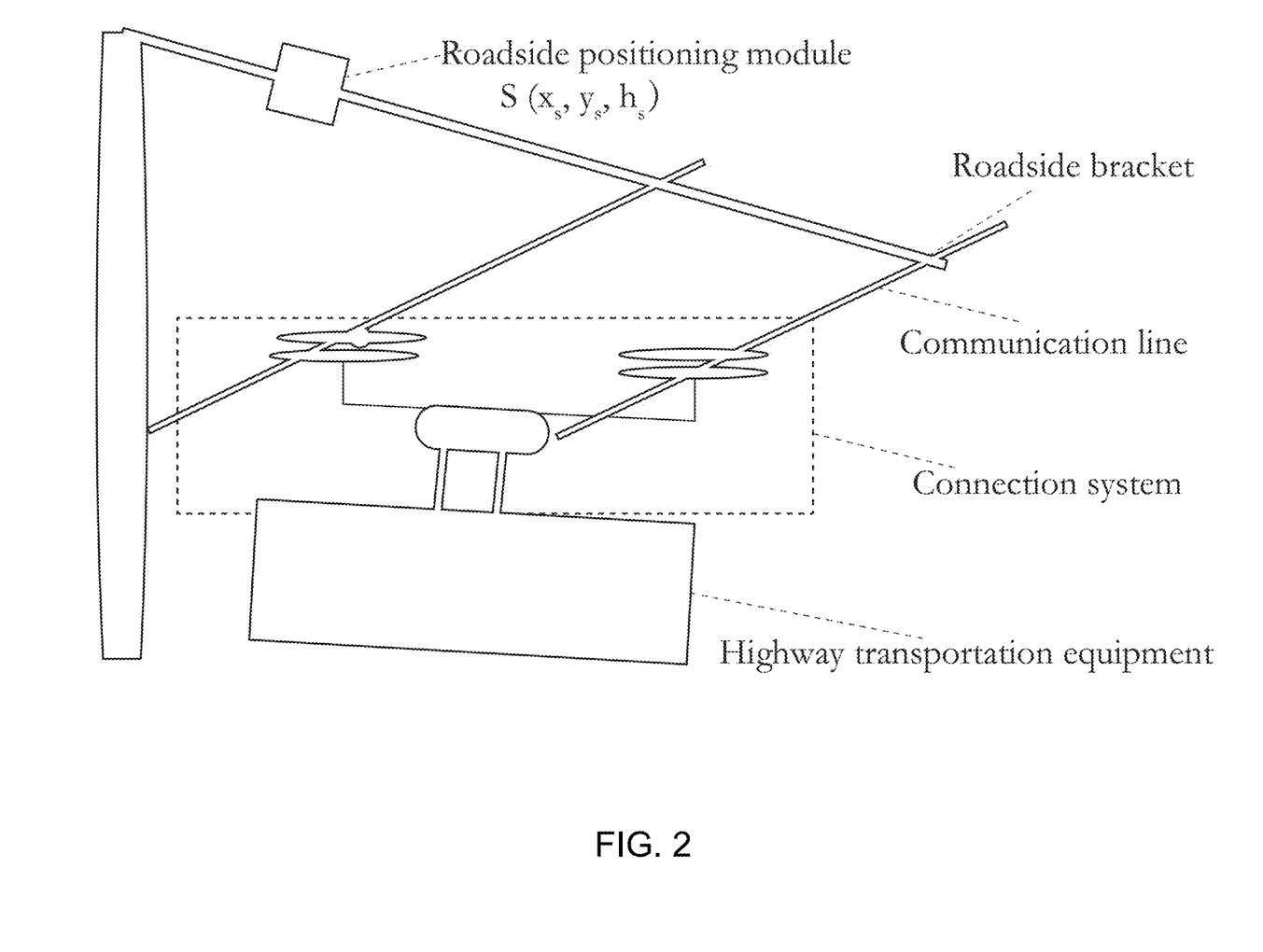
FIG. 2 is a schematic diagram of a vehicle-road cooperation positioning system based on an electrified highway provided by an embodiment of the present invention.

Specifically, the vehicle-road cooperation positioning system of the electrified highway consists of a roadside bracket, a roadside positioning module, a communication line, and a vehicle-road connection information system. As shown in FIG. 2, the roadside bracket and the communication line are arranged along with the electrified highway network. A wired communication line is additionally arranged on the existing electrified highway grid system, and a communication connection device is added to the original power receiving system while electrified highway transportation equipment (vehicle) is connected to the grid, so as to ensure a wired connection to the road network communication line.

The roadside positioning module is fixed to the roadside bracket and is internally provided with absolute position information of the point. The roadside positioning module is connected to the line by means of a physical interface in a wired way. The transportation equipment is connected to the roadside positioning module through the communication line. By sensing the position of the transportation equipment at a connection point of the grid, the roadside positioning module determines coordinate information of the connection point based on the absolute position coordinates of the roadside positioning module itself as the benchmark, and transmits the coordinate information of the connection point to the vehicle.

A roadside power transmission system includes: a roadside bracket, a roadside positioning module, and a communication line (power transmission line).

The vehicle-road connection information system includes: a pantograph, an attitude angle sensor, a communication harness, and a vehicle-mounted unit.

Figure 3:
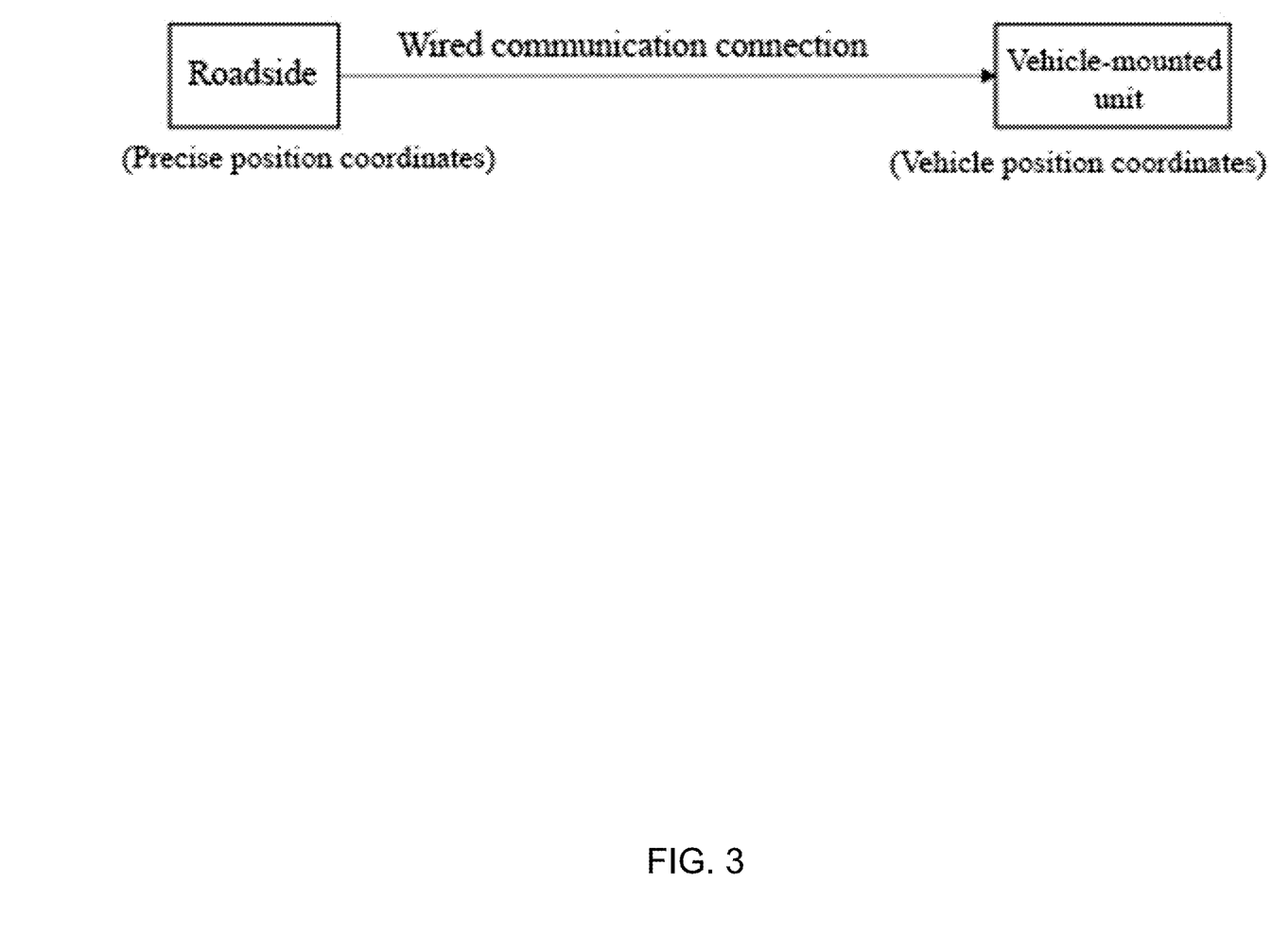
FIG. 3 is a schematic diagram of a wired connection provided by an embodiment of the present invention.

At the vehicle end, as shown in FIG. 3, the vehicle-mounted unit is connected to the roadside power transmission line through the communication harness and by means of the pantograph, and finally achieves wired communications with the roadside positioning modules arranged on each crossbar bracket. The roadside positioning module sends its own position information to the vehicle-mounted unit through the communication line. By sensing a power receiving contact point and combining pantograph attitude information transmitted by the pantograph attitude angle sensor, built-in pantograph size parameters and installation parameters, the vehicle-mounted unit calculates vehicle position information.

Preferably, acquiring a contact signal when the vehicle-road connection information system comes into contact with the communication line, and determining position information of a contact point according to the contact signal and the absolute coordinates includes:
when the pantograph comes into contact with the communication line, acquiring a contact signal at the contact point, and respectively transmitting the contact signal to two roadside positioning modules closest to the contact point;
by using the roadside positioning module that first receives the contact signal, calculating a distance between the contact point and the roadside positioning module according to the time when the roadside positioning module receives the contact signal, the distance including a longitudinal offset and a lateral offset; and
determining position information of the contact point according to the longitudinal offset, the lateral offset and the position information of its own positioning point of the roadside positioning module.

Preferably, based on a conversion algorithm, determining current vehicle mass center position coordinate information according to the position information of the contact point and parameter information of the vehicle-road connection information system includes:
determining position information of two end points of the lower arm rod according to structural parameter information of the pantograph, the attitude angle and the position information of the contact point; and
based on a conversion algorithm between a contact point and a vehicle mass center position, determining the current vehicle mass center position coordinate information according to the position information of the two end points.

Further, the vehicle-road cooperation precise positioning method based on an electrified highway in this embodiment includes following steps:

1) Reference Coordinates

In the process of electrified highway grid layout, the position of a roadside pole supporting a hanging wire is fixed, and the installation position of a roadside positioning module relative to a crossbar is determined. In the process of line construction and device layout, its absolute latitude and longitude coordinates relative to a geodetic coordinate system may be measured as known reference latitude and longitude coordinates S(xs,ys,hs).

2) Coordinates of Contact Points of Each Slider on the Line

In the process of electrified highway layout, the neutral line and live line are both power transmission lines and signal lines for information transmission. The signal line is connected to the transportation equipment by means of a power receiving system to achieve communications. Since the position of each point A i on the line relative to the reference point S of the support crossbar is fixed, the distance from the reference point S to $A_i$ may be represented by a translation vector $\overrightarrow{SA_i}$, that is, the relative position coordinates of each point relative to the nearest pole are known, and then the absolute coordinates $A_i$ ($X_b$, $y_b$, $h_b$) of each point on the line can be calculated.

Figure 4:
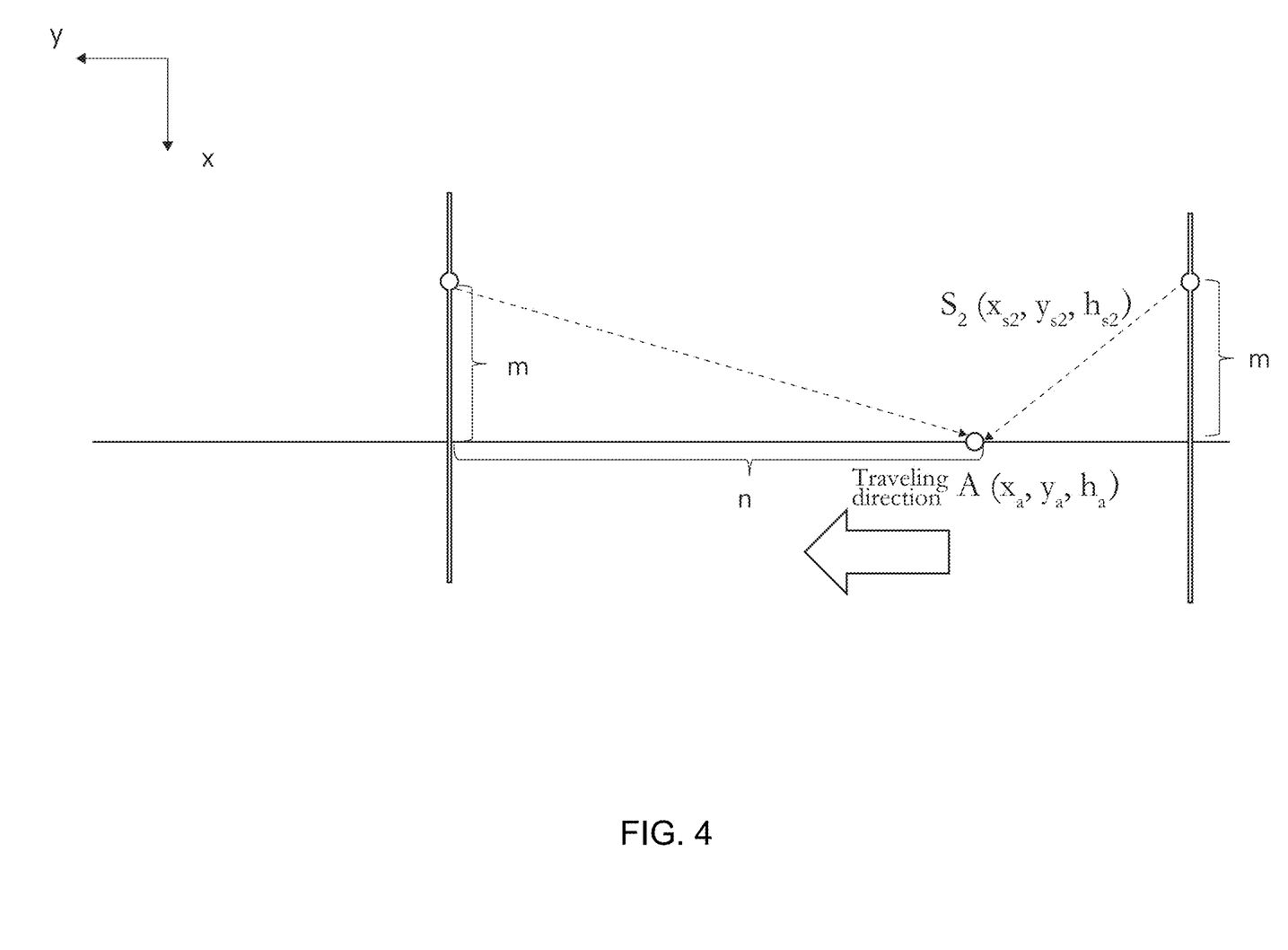
FIG. 4 is a schematic diagram of offset calculation provided by an embodiment of the present invention.

Specifically, as shown in FIG. 4, when the pantograph slider comes into contact with a certain point $A_i$ on the transmission line, a contact signal will be immediately generated and transmitted to two roadside positioning units S1 and S2 closest to its contact point. The roadside positioning unit that first receives the contact point signal calculates a distance f between the contact point and the roadside positioning module S according to the time when the roadside positioning module receives the contact signal. The distance includes two parts. One part can be regarded as a lateral offset m, which is a known quantity on the premise that the circuit lines are tensioned in the process of engineering layout. Furthermore, a longitudinal offset n of the contact point relative to the opposite point S may be obtained, where, n=f−m.

thus:

$$x_a = x_{s1} + m;$$
$$y_a = y_{s1} - n;$$
$$h_a = h_s;$$

3) Coordinates of a Connection Point Between the Vehicle and the Pantograph

Figure 5:
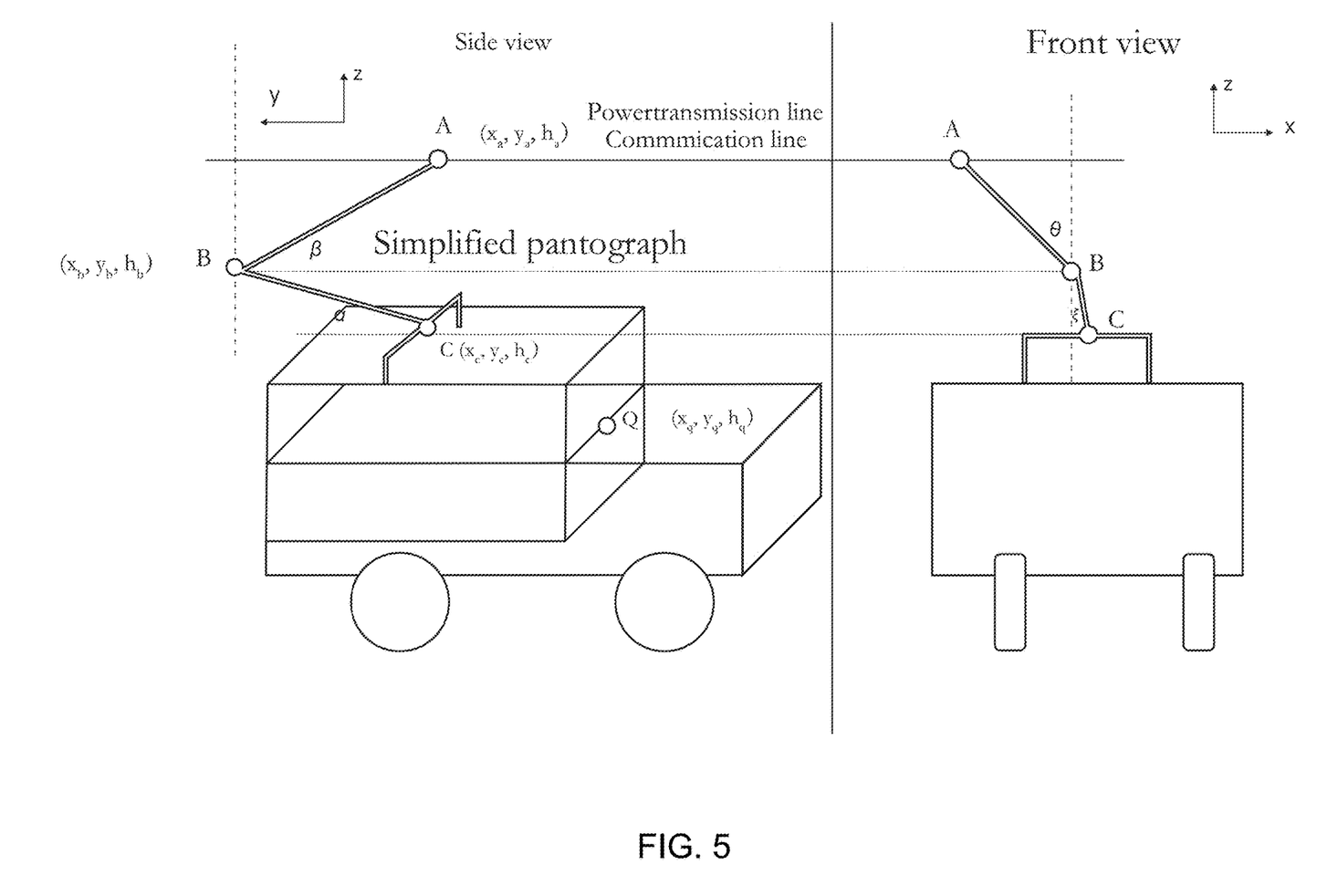
FIG. 5 is a schematic diagram of pantograph calculation according to an embodiment of the present invention.
Figure 6:
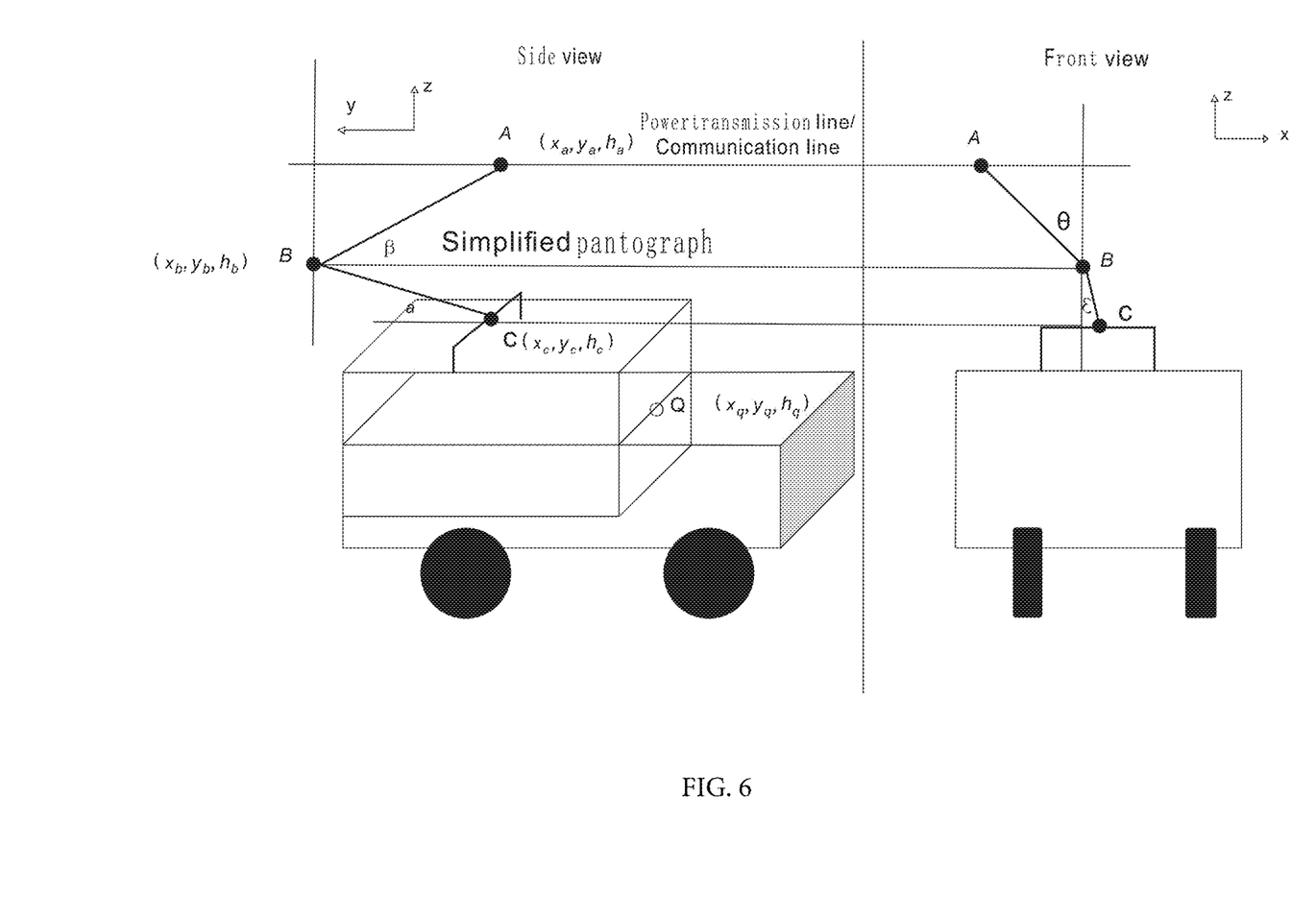

As shown in FIG. 5, the vehicle is connected to an electrified highway power transmission line through the pantograph. In order to ensure effective power transmission when the vehicle is traveling on an electrified highway, the pantograph of the vehicle is simplified as shown in the figure. The pantograph of the vehicle is semi-rigidly connected to the power transmission line while the vehicle is traveling. The attitude angle sensor installed on the pantograph can measure four attitude angles of the upper arm rod AB and lower arm rod BC of the pantograph in real time while the vehicle is traveling, namely, on the longitudinal plane, an angle α between the lower arm rod and the horizontal plane, and an angle β between the upper arm rod and the horizontal plane; and on the transverse plane, an angle between the lower arm rod and the vertical line, and an angle between the upper arm rod and the vertical line.

Since the lengths of the upper arm rod and lower arm rod of the pantograph are known, the lengths are counted as $L_{ab}$ and $L_{bc}$.

Thus, the coordinates of point B are ($x_b$, $y_b$, $h_b$)

$$x_b = x_a + L_{ab} * \sin\theta;$$
$$y_b = y_a + L_{ab} * \cos\beta;$$
$$h = h_a - L_{ab} * \sin\beta.$$

In the same way, the coordinates of point C may be calculated as $$x_c = x_b + L_{bc} * \sin\varepsilon = x_a + L_{ab} * \sin\theta + L_{bc} * \sin\varepsilon;$$
$$y_c = y_b - L_{bc} * \cos\alpha = y_a + L_{ab} * \cos\beta - L_{bc} * \cos\alpha;$$
$$h = h_b - L_{bc} * \sin\alpha = h_a - L_{ab} * \sin\beta - L_{bc} * \sin\alpha.$$

4) Vehicle Coordinates

The pantograph system mounted on the vehicle is of a mechanical connection structure. By acquiring the coordinate information of the contact point and using the conversion algorithm between the contact point and the vehicle mass center position, the current vehicle mass center position coordinate information Q ($x_Q$, $y_Q$, $h_Q$) may be accurately determined.

In the specific implementation process, the present invention includes following steps:

1. An electrified highway is laid and power line carrier technology is carried to ensure that information transmission can be completed while transmitting power to electrified transportation equipment.

2. The roadside positioning module is arranged on an electrified highway crossbar bracket, the arrangement position is determined, a coordinate value of the roadside positioning module Si is measured and input into the roadside positioning unit.

3. The electrified highway transportation equipment is equipped with vehicle-mounted units and a power receiving communication system, and system parameters (position of the pantograph connection point relative to the mass center, geometric parameters of the pantograph, length of the upper arm rod, length of the lower arm rod, etc.) are provided into the vehicle-mounted units.

4. The electrified highway transportation equipment is driven into the electrical highway to ensure that the power receiving system is physically connected, that is, the wired communication system between the roadside positioning module and the vehicle-mounted units is smooth.

5. During the traveling, the attitude angle sensor of the pantograph transmits the pantograph attitude information to the vehicle-mounted unit in real time, and the vehicle-mounted unit acquires precise position of the current vehicle by sending information to the roadside communication unit and receiving information returned from the roadside positioning module.

The beneficial effects of the present invention are as follows:

(1) The present invention realizes not only vehicle-road energy connections but also vehicle-road information communications by connecting a vehicle to the grid, so that known positioning information of the pillar and grid in the process of electrified highway construction is converted into real-time vehicle information in real time, thereby accurately determining real-time position information of the vehicle, for decision-making control of an intelligent vehicle under a high-speed transportation condition.

(2) In the process of real-time acquisition of vehicle dynamic position information, the present invention does not rely on a satellite positioning system at all and is based on a wired vehicle-road connection of the electrified highway, so that the timeliness and reliability are higher.

(3) The core infrastructure in the positioning scheme of the present invention is known positioning information of a road network, which information has been accurately obtained in the process of electrified highway construction. When a vehicle is physically connected to the grid through contact, vehicle position information is acquired by judging the position where the vehicle is connected to the grid, so that the timeliness and accuracy of information acquisition as well as the compatibility between different vehicles are higher.

(4) The positioning scheme of the present invention is implemented by adding a communication line to the original electrified highway transportation system, so that modifications to the vehicle end are less, and the costs of additional facilities based on the electrified highway transportation equipment are low.

Various embodiments in this specification are described in a progressive manner. Each embodiment focuses on the differences from other embodiments. The same and similar parts among various embodiments can be referred to each other.

Specific examples are applied herein to illustrate the principles and implementations of the present invention. The description of the above embodiments is only intended to help understand the method and its core idea of the present invention. Meanwhile, for those of ordinary skill in the art, there will be changes in the specific implementation and application scope according to the idea of the present invention. In summary, the content of this description should not be construed as a limitation of the present invention.

The invention claimed is:

1. A vehicle-road cooperation precise positioning method based on an electrified highway, wherein the method is applied to a vehicle-road cooperation positioning system of the electrified highway, and the vehicle-road cooperation positioning system of the electrified highway comprises a roadside bracket, a roadside positioning module, a communication line and a vehicle-road connection information system, wherein the roadside bracket, the roadside positioning module and the communication line are all arranged on the electrified highway, the roadside positioning module is fixed to the roadside bracket, and the roadside positioning module is connected to the vehicle-road connection information system through the communication line;

the method comprising:
measuring position information of a positioning point of the vehicle-road cooperation positioning system by using the roadside positioning module;
determining coordinates of the communication line according to the position information;
acquiring a contact signal during the time that the vehicle-road connection information system comes into contact with the communication line, and determining position information of a contact point according to the contact signal and the absolute coordinates; and
based on a conversion algorithm, determining current vehicle mass center position coordinate information according to the position information of the contact point and parameter information of the vehicle-road connection information system,
wherein the vehicle-road connection information system comprises: a pantograph, an attitude angle sensor, a communication harness and a vehicle-mounted unit, wherein the pantograph comprises an upper arm rod and a lower arm rod which are connected to each other; the upper arm rod is flexibly connected to the communication line while the vehicle is traveling;
the vehicle-mounted unit is connected to the communication line through the communication harness and by means of the pantograph; the attitude angle sensor is arranged on the pantograph; and the attitude angle sensor is configured to measure attitude angles of the upper arm rod and the lower arm rod in real time.

2. The vehicle-road cooperation precise positioning method based on an electrified highway of claim 1, wherein the roadside positioning module is connected to the communication line by means of a physical interface in a wired way; and the communication line is configured for power and information transmission.

3. The vehicle-road cooperation precise positioning method based on an electrified highway of claim 1, wherein acquiring a contact signal when the vehicle-road connection information system comes into contact with the communication line, and determining position information of the contact point according to the contact signal and the absolute coordinates comprises:
when the pantograph comes into contact with the communication line, acquiring the contact signal at the contact point, and respectively transmitting the contact signal to two roadside positioning modules closest to the contact point;
by using the roadside positioning module that first receives the contact signal, calculating a distance between the contact point and the roadside positioning module according to the time when the roadside positioning module receives the contact signal, the distance including a longitudinal offset and a lateral offset; and
determining position information of the contact point according to the longitudinal offset, the lateral offset and the position information of a positioning point of the roadside positioning module.

4. The vehicle-road cooperation precise positioning method based on an electrified highway of claim 3, wherein based on a conversion algorithm, determining current vehicle mass center position coordinate information according to the position information of the contact point and parameter information of the vehicle-road connection information system comprises:
determining position information of two end points of the lower arm rod according to structural parameter information of the pantograph, the attitude angle and the position information of the contact point; and
based on a conversion algorithm between a contact point and a vehicle mass center position, determining the current vehicle mass center position coordinate information according to the position information of the two end points.

* * * * *